(12) United States Patent
Nakao et al.

(10) Patent No.: US 6,895,826 B1
(45) Date of Patent: May 24, 2005

(54) CORIOLIS MASS FLOWMETER

(75) Inventors: Yuichi Nakao, Tokyo (JP); Yasuichi Shiraishi, Tokyo (JP); Satoru Nihei, Tokyo (JP); Seiji Kobayashi, Tokyo (JP); Yasushi Ito, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 09/485,017

(22) PCT Filed: May 28, 1999

(86) PCT No.: PCT/JP99/02834

§ 371 (c)(1),
(2), (4) Date: Apr. 6, 2000

(87) PCT Pub. No.: WO99/63309

PCT Pub. Date: Dec. 9, 1999

(30) Foreign Application Priority Data

| May 29, 1998 | (JP) | ............................................ 10/148492 |
| Jun. 5, 1998 | (JP) | ............................................ 10/156951 |

(51) Int. Cl.[7] ................................................ G01F 1/84
(52) U.S. Cl. ................................................... 73/861.355
(58) Field of Search ...................... 73/861.354, 861.355, 73/861.356, 861.357

(56) References Cited

U.S. PATENT DOCUMENTS

| 4,811,606 | A | * | 3/1989 | Hasegawa et al. ......... 73/861.38 |
| 4,895,031 | A | * | 1/1990 | Cage ...................... 73/861.355 |
| 4,955,239 | A | * | 9/1990 | Cage et al. ............. 73/861.355 |
| 5,060,523 | A | | 10/1991 | Lew | |
| 5,297,426 | A | * | 3/1994 | Kane et al. .................... 73/202 |
| 5,349,872 | A | * | 9/1994 | Kalotay et al. ......... 73/861.355 |
| 5,425,277 | A | | 6/1995 | Lew | |
| 5,831,178 | A | | 11/1998 | Yoshimura et al. | |
| RE36,376 | E | * | 11/1999 | Cage et al. ............. 73/861.355 |

FOREIGN PATENT DOCUMENTS

| DE | 38 24 351 | 1/1990 |
| DE | 40 26 724 | 3/1992 |
| FR | 2 598 801 | 11/1987 |
| JP | 64-15 | 1/1989 |
| JP | 2-206722 | 8/1990 |
| JP | 5-14843 | 2/1996 |
| JP | 8-128876 | 5/1996 |
| JP | 8-219843 | 8/1996 |
| JP | 8-254452 | 10/1996 |
| JP | 9-126851 | 5/1997 |
| JP | 9-250940 | 9/1997 |

* cited by examiner

Primary Examiner—Harshad Patel
(74) Attorney, Agent, or Firm—McGlew and Tuttle, P.C.

(57) ABSTRACT

The Coriolis mass flow meter of this invention comprises two parallel curved flow tubes 1 and 2, a drive unit 15, and a pair of vibration sensors 16 and 17. An inlet-side manifold 24 dividing the flow of a fluid being measured into the two flow tubes 1 and 2 from the inlet thereof, and an outlet-side manifold 25 joining the fluid flows flowing in the two flow tubes 1 and 2 to discharge from the fluid outlet thereof are mechanically connected to a meter body 30 only at the inlet side of the inlet-side manifold 24 and at the outlet side of the outlet-side manifold 25, respectively. With this arrangement, the effects of vibration transmitted from the meter body 30 and all structures connected thereto can be reduced at the joint parts between the inlet-side and outlet-side manifolds 24 and 25 that serve as vibration fulcrums.

8 Claims, 7 Drawing Sheets

Details of part A    Details of part B

Details of part C (A)

(B) Primary vibration mode (C) Secondary vibration mode

CORIOLIS MASS FLOWMETER

FIELD OF THE INVENTION

This invention relates generally to a Coriolis mass flow meter, and more particularly to a Coriolis mass flow meter of a type using two parallel flow tubes and a layout of coils and magnets thereof.

BACKGROUND ART

A mass flow meter (Coriolis mass flow meter) based on the operating principle that when a flow tube through which a fluid being measured flows is supported at an end or both ends thereof, and is caused to vibrate at the fulcrums in a direction vertical to the direction of flow of the fluid in the flow tube, a Coriolis force acting on the flow tube is proportional to the mass flow of the fluid is well known. The Coriolis mass flow meter can be roughly divided into two types; a curved-tube type and a straight-tube type.

The straight-tube Coriolis mass flow meter, when caused to vibrate in a direction vertical to the axis of the straight tube at the central part of the straight tube supported at both ends thereof, detects mass flow as a displacement difference of the straight tube caused by a Coriolis force between the supporting parts and a central part of the straight tube, that is, as a phase difference signal. Despite its simple, compact and sturdy construction, the straight-tube Coriolis mass flow meter cannot accomplish high detection sensitivity.

The curved-tube Coriolis mass flow meter, on the other hand, can detect mass flow with high sensitivity since it can select the optimum shape for making effective use of Coriolis forces. In addition, a construction of the curved-tube Coriolis mass flow meter in which two parallel curved tubes through which a fluid being measured flows. are provided to effectively drive the curved-tubes is also well known.

FIG. 10 is a schematic diagram of a conventional type of two parallel curved-tube Coriolis mass flow meter, as mentioned above. As shown in the figure, flow tubes 1 and 2 comprise two parallel curved tubes (U-shaped tubes), and are caused to resonate with each other in an opposite phase by a drive unit 15 comprising a coil and a magnet, disposed at the central part of the flow tubes 1 and 2. A pair of vibration sensors 16 and 17, each comprising a coil and a magnet, are disposed at symmetrical positions with respect to the mounting position of the drive unit 15 to detect a phase difference proportional to Coriolis forces. A fluid being measured flows from an external flow tube connected via a flange 18 on the inlet side into a tubular meter body 34, and is diverted 90 degrees by a deflector plate 35, and divided equally to the two flow tubes 1 and 2. The divided flows are then joined at the outlet side of the flow tubes 1 and 2, diverted 90 degrees by a deflector plate 36, and discharged to an external flow tube connected via a flange 19 on the outlet side. By causing the fluid being measured to flow equally in the two flow tubes 1 and 2, as described above, the natural frequencies of the two flow tubes 1 and 2 can be maintained equal despite differences in the type of the fluid or in temperature. This allows the flow tubes to be driven efficiently and stably. Thus, a Coriolis mass flow meter that is not affected by external vibration and temperature can be accomplished.

However, this conventional type of Coriolis mass flow meter using two parallel curved flow tubes has not been perfect in isolating external vibration.

As shown in the figure, base plates 27 and 28 are provided on the two flow tubes 1 and 2, serving as the first fulcrum of vibration, while the joint parts between the two flow tubes 1 and 2 and the meter body 34 act as the second fulcrum of vibration of the flow tubes; both constituting an important basis for the vibration of the entire tubes. In the conventional type of Coriolis mass flow meter, however, the second fulcrum has not been perfectly isolated from vibration transmitted from the outside. As a result, external vibration transmitted from the meter structures, casing, etc. has had adverse effects on the performance of the Coriolis mass flow meter.

Furthermore, since this type of Coriolis mass flow meter using flow tubes comprising two parallel curved tubes has in its construction a branching part on the inlet side of the fluid being measured and a confluence part on the outlet side, pressure loss or fluid clogging is apt to occur. This is particularly true when a highly viscous fluid or a perishable and easy-to-clog fluid, such as food, is involved.

Furthermore, this type of Coriolis mass flow meter is required to be of a low-cost and sturdy construction so that it is sufficiently reliable even in case of damage to flow tubes. The conventional type of Coriolis mass flow meter, however, has been short of the requirement.

The conventional type of Coriolis mass flow meter has not been designed taking into account the effects of higher-order vibration modes that are intrinsic to vibrating flow tubes.

A drive unit 15 for driving the flow tubes 1 and 2 comprising two parallel curved tubes at the central part thereof normally comprises a coil and a magnet. The coil of the drive unit is installed on any one of the two flow tubes 1 and 2, and the magnet thereof is on the other flow tube so that the two flow tubes 1 and 2 are caused to resonate at an opposite phase with each other. A pair of vibration sensors 16 and 17, each comprising a coil and a magnet, are disposed at symmetrical positions with respect to the mounting position of the drive unit 15 to detect a phase difference proportional to a Coriolis force. The coils and magnets of these sensors are also provided in such a manner that the coil is disposed on any one of the flow tubes, and the magnet on the other flow tube via fixtures.

In these drive unit 15 and the vibration sensors 16 and 17, only the coils require wiring, and the magnets require no wiring. As a result, the wiring has been provided only on the surface of the flow tube having the coil in the conventional type of Coriolis mass flow meter. The conventional type of Coriolis mass flow meter, however, has not necessarily taken into consideration the effects of the wiring on the vibration of the flow tube: the coils of the drive unit 15 and the vibration sensors 16 and 17 have been concentrated on any one flow tube. As a result, this causes the effects of the mass and tension of the wiring to be concentrated on only the flow tube on which the coil is installed, disturbing the balance of the two flow tubes and resulting in adverse effects on the performance of the Coriolis mass flow meter.

This invention is intended to overcome the problems of the Coriolis mass flow meter of a type using two parallel curved tubes. It is an object of this invention to provide a high-precision Coriolis mass flow meter that ensures high vibration stability by isolating vibration transmitted from the outside to the vibration fulcrums.

It is another object of this invention to reduce the effects of higher-order vibration modes of the flow tubes.

It is a further object of this invention to provide a Coriolis mass flow meter of such a construction that vibration is hard to be transmitted via an inlet passage, and to substantially reduce pressure loss at the branching part at the fluid inlet and at the confluence part at the fluid outlet.

It is a further object of this invention to provide a Coriolis mass flow meter of a low-cost, mechanically strong and reliable construction, and to accomplish high accuracy by improving the vibration balance between the two flow tubes.

It is a further object of this invention to provide a thin-walled pressure-resistant case that can withstand very high pressures by forming the pressure-resistant case integrally with the meter body and rounding all corners of the case.

It is still a further object of this invention to reduce the adverse effects on the performance of the Coriolis mass flow meter by dispersing the coils of the drive unit and a pair of sensors to the two flow tubes, while disturbing the effects of the wiring so as to maintain the balance between the two flow tubes.

DISCLOSURE OF THE INVENTION

The Coriolis mass flow meter of this invention has two flow tubes 1 and 2 comprising two parallel curved tubes. A drive unit 15 drives the flow tubes to cause any one flow tube to resonate with the other flow tube in an opposite phase with each other, while a pair of vibration sensors 16 and 17 are disposed at symmetrical positions with respect to the mounting position of the drive unit 15 to detect a phase difference proportional to a Coriolis force. An inlet-side manifold 24 divides a fluid being measured into the two flow tubes 1 and 2, whereas an outlet-side manifold 25 joins the fluid flows in the two flow tubes 1 and 2 to discharge from the fluid outlet. In this type of Coriolis mass flow meter, inlet-side and outlet-side manifolds are connected mechanically to a meter body 30 only at the inlet side of the inlet-side manifold 24 and at the outlet side of the outlet-side manifold 25, respectively. With this arrangement, the effects of vibration transmitted from the meter body 30 and all structures connected thereto can be reduced at connecting ends between the inlet-side and outlet-side manifolds 24 and 25 and the flow tubes 1 and 2. In this way, this invention can provide a high-precision Coriolis mass flow meter having high vibration stability by isolating the connecting parts between the flow tubes and the meter body that act as vibration fulcrums from vibration transmitted from the outside.

According to this invention, the fluid passages on the inlet-side and outlet-side manifolds 24 and 25 are smoothly diverted while describing circular arcs from the inlet and outlet, respectively, and the total cross-sectional areas of the fluid passages are continuously changed. This effectively prevents pressure loss or fluid clogging at the fluid branching or confluence parts.

This invention can provide inlet-side and outlet-side manifolds 24, 25 having no particular natural frequencies so as to prevent disturbing vibration from being amplified or vibration from being transmitted by forming the manifolds into curved blocs, while continuously increasing the shape thereof.

This invention can provide a high-precision flow meter having such a construction that can withstand bending and twisting and keep the vibration of the tubes from being affected by external stresses by providing a meter body 30 having a U-shaped cross section for holding connecting ports at both ends and the entire flow meter, and constructing the meter body into a box construction by disposing a base plate on top of the meter body without interfering the vibration fulcrums.

This invention can provide a pressure-resistant container that is reliable even in case of damage to a tube by imparting a very high pressure resistance even with thin walls by integrally fitting an inverted U-shaped case 31 to the meter body 30 of a U-shaped cross section and has a circular-arc outer periphery, with rounded corners.

This invention can prevent inertial moment caused by vibration inertial force from being generated by disposing a drive unit 15 and a pair of vibration sensors 16, 17 between the two flow tubes and aligning them with the central axes of the tubes.

This invention can perfectly maintain the symmetry of vibration beams without being affected by the secondary vibration mode, and isolate external vibration almost completely by disposing a pair of vibration sensors 16, 17 at the nodes of the secondary vibration mode at the proximal parts at the inlet and outlet sides.

This invention can obtain very stable vibration and very high accuracy without being affected by external vibration by providing the wiring to the drive unit 15 and a pair of the vibration sensors 16, 17 using flexible printed circuit boards 12, 13 bent symmetrically from both sides of the flow tubes, and making additional mass and additional stress symmetrical.

A drive unit coil 3 is installed on a flow tube 1, and a drive unit magnet 6 is the other flow tube 2, whereas vibration sensor magnets 7 and 8 are installed on a flow tube 1 on which the drive unit coil 3 is installed, and vibration sensor coils 4 and 5 are installed on the other flow tube 2. In this way, coils of the drive unit and the vibration sensors are dispersed on the two flow tubes, distributing the effects of the wiring so as to maintain the balance between the two flow tubes and to reduce the adverse effects on the performance of the Coriolis mass flow meter.

The Coriolis mass flow meter of this invention has a support post 10 facing at the end thereof the drive unit 15 provided at the central part of the flow tubes and having wires for electrical connection passed therein. The end surface of the support post 10 is connected to the drive unit coil 3 via a first flexible printed circuit board 12, while the vibration sensor coils 4 and 5 are connected to the wiring (Teflon wire 14) provided on the surfaces of the flow tubes via a second flexible printed circuit board 13 so that the wiring is deflected at the central part of the flow tubes in an almost symmetrical position with respect to the vibration center of each flow tube. In this way, the effects of the flexible printed circuit boards on the flow tubes can be minimized and equalized by making the rigidity and shape of flexible printed circuit boards for the wiring extending from the flow tubes toward the support post almost the same and dividing the flexible printed circuit boards to the two flow tubes to disperse the effects of the flexible printed circuit boards on the flow tubes and make the width of the flexible printed circuit boards narrower.

BEST MODE FOR CARRYING OUT THE INVENTION

Although this invention can be applied equally to Coriolis mass flow meters of all types using two parallel flow tubes, a Coriolis mass flow meter of a gate type will be specifically described in the following as a typical example of the two parallel curved tube type.

Figure 1:
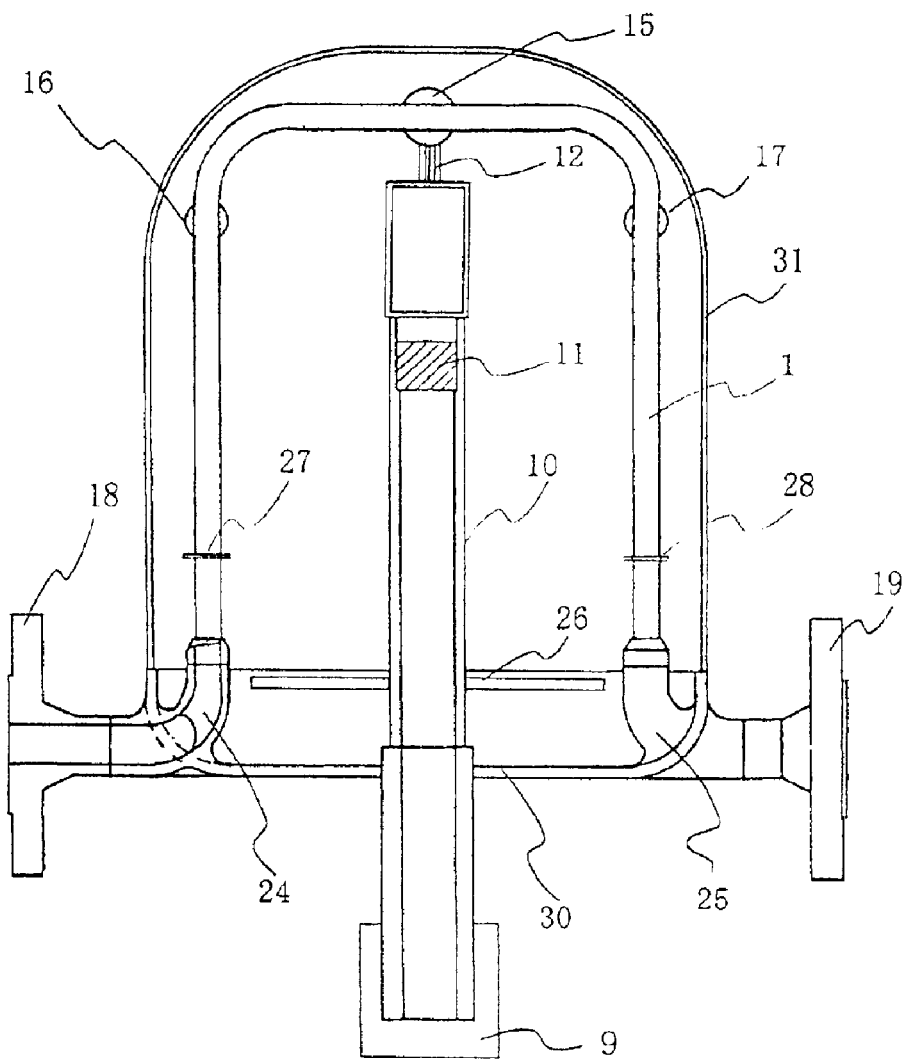
FIG. 1 is a diagram illustrating a first example of Coriolis mass flow meter to which this invention is applied. It is a front view of a Coriolis mass flow meter having two parallel curved tubes installed on a vertical plane.
Figure 2:
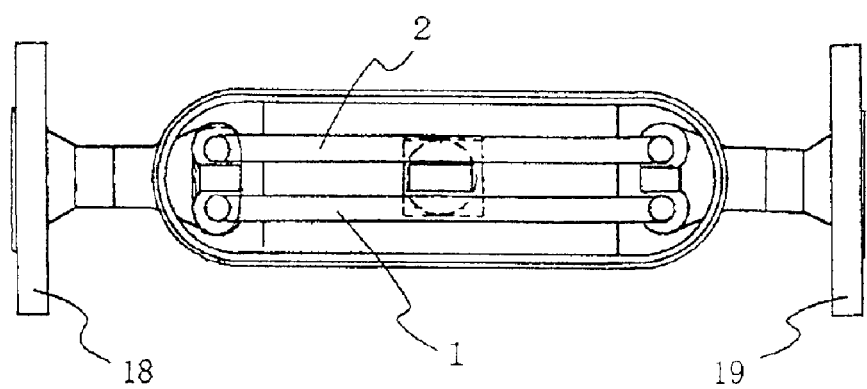
FIG. 2 is a cross-sectional view of the Coriolis mass flow meter shown in FIG. 1.
Figure 3:
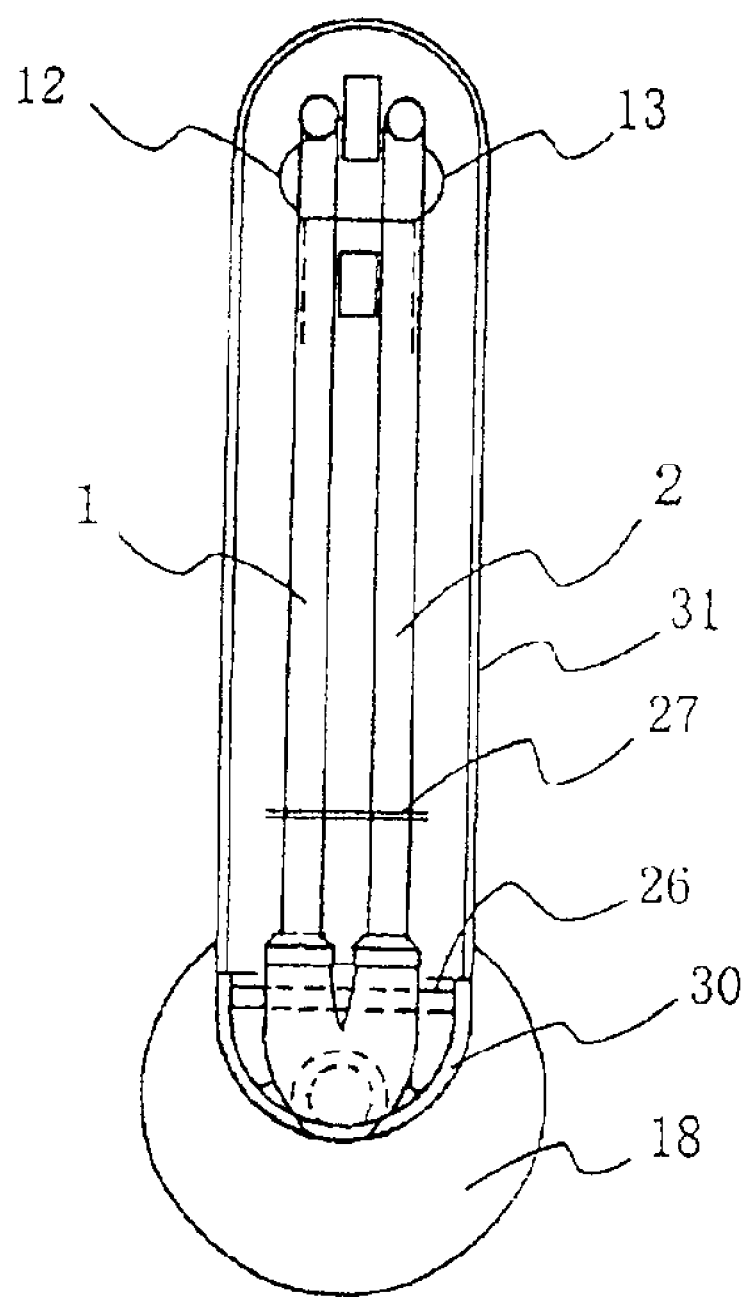
FIG. 3 is a cross-sectional view of the Coriolis mass flow meter shown in FIG. 1

FIGS. 1 through 3 are diagrams illustrating a first example of Coriolis mass flow meter to which this invention is applied, where flow tubes comprising of two parallel curved tubes are installed on a vertical plane. FIG. 1 is a partially cross-sectional front view of a Coriolis mass flow meter. FIG. 2 is a partially cross-sectional top view of the Coriolis mass flow meter installed on a vertical plane (shown in FIG. 1). FIG. 3 is a cross-sectional side view of the Coriolis mass flow meter shown in FIG. 1.

Flow tubes 1 and 2 of the Coriolis mass flow meter shown in the figures are two inverted U-shaped tubes formed into substantially the same shape, with both ends thereof connected to manifolds 24 and 25, which will be described in detail later as one of characteristics of this invention. It is assumed that a fluid being measured enters into the tubes from the left side of FIG. 1 and flows out of the tubes toward the right side. That is, the fluid entering from an external flow tube connected via a flange 18 is divided equally at the inlet-side manifold 24 to the two flow tubes 1 and 2. The divided flows are joined together at the manifold 25 on the outlet side of the flow tubes 1 and 2, and discharged into an external flow tube connected via a flange 19.

A meter body 30 holding connecting ports at both ends and the entire flow meter has a U-shaped cross section, as shown in FIG. 1 or FIG. 3 which is a cross-sectional side view, and a base plate 26 is fitted in such a manner to cover the top opening of the meter body 30, excluding the areas occupied by the manifolds 24 and 25. That is, the meter body 30 having a U-shaped cross section is formed into a box shape, together with the base plate 26.

In the vicinity of both ends of the flow tubes 1 and 2 provided are base plates 27 and 28 serving as nodes when the flow tubes are driven like a tuning fork. The base plates 27 and 28 are fixedly fitted to the flow tubes 1 and 2 so as to maintain the flow tubes 1 and 2 in parallel with each other.

As described earlier with reference to the prior art, the points at which the base plates 27 and 28 are fixedly fitted to the flow tubes 1 and 2 serve as the first fulcrums of vibration, while the top connecting ends of the manifolds 24 and 25 serve as the second fulcrums. In the present embodiment of this invention, the second fulcrums of vibration are isolated from the meter body 30, and the base plate 26, the pressure-resistant case 31 and all other structures connected to the meter body 30. The meter body 30 is mechanically connected to the manifolds 24 and 25 only at the inlet side and the outlet side, respectively. To form the second vibration fulcrums, it is necessary to connect the two flow tubes together. This can be achieved not only by using base plates as in the case of the first vibration fulcrums, but by using monolithic blocks of manifolds, as in the present embodiment.

As described above, this invention, which has such a construction that the existence of the second vibration fulcrums reduces the effects of vibration transmitted from the outside, can achieve high vibration stability and a high-precision Coriolis mass flow meter. Furthermore, the box construction consisting of the meter body having a U-shaped cross section and the base plate 26 can withstand bending and twisting.

Since the pressure-resistant case 31 of an inverted U-shaped cross section is integrally fitted to the meter body 30 of a U-shaped cross section, the outer periphery of the entire assembly forms a circular arc shape, with all corners rounded, maintaining very high pressure resistance even with thin walls. Should a flow tube be damaged, the fluid inside the tube never flows out of the pressure-resistant case.

As described above, the fluid being measured passes through the flange 18 at the inlet passage, and is divided equally to the two flow tubes 1 and 2 through the inlet-side manifold 24. The divided fluid flows are then joined together at the manifold 25. At this time, the fluid path of the manifold 24 shown as an embodiment of this invention is smoothly diverted 90 degrees, describing a circular arc, from the inlet (the part connected to the flange 18) (see FIG. 1), and led to the part connected to the flow tubes 1 and 2. The fluid entering from one inlet passage is divided into two flow paths in the two flow tubes 1 and 2 (see FIG. 3). The total cross-sectional area of the flow paths is continuously reduced to the cross-sectional area of the flow tubes. This substantially reduces pressure loss. The total cross-sectional area of flow tubes is usually designed to be approximately 0.7~0.8 of the cross-sectional area of the external flow tube because the fluid tends to flow in the flow tubes at a higher flow rate than in the external flow tube, resulting in increased Coriolis forces.

The manifold 24 having such a flow path can be designed in such a manner that it has no particular natural frequency by continuously increasing its shape and forming it into a curved bloc. When designed into such a construction, the manifold 24 can prevent disturbing vibration from being amplified and vibration from being transmitted.

Although detailed description about the manifold 25 on the outlet side is omitted because the manifold 25 is provided at a symmetrical position with respect to the manifold 24 and in substantially the same size and shape as the manifold 24, the flow paths from the two flow tubes 1 and 2 are joined together at the manifold 25 while the total cross-sectional area thereof is continuously increased, leading to the outlet passage.

The drive unit 15 usually comprises a magnet and a coil, and drives the flow tubes comprising two parallel curved tubes at the center thereof to cause them to resonate with each other in an opposite phase. A pair of vibration sensors 16 and 17 each comprise a magnet and a coil, and are disposed at symmetrical positions with respect to the mounting position of the drive unit 15 to detect a phase difference proportional to a Coriolis force. The drive unit 15 and the vibration sensors 16 and 17 shown in the figure are each disposed between the axes of the flow tubes 1 and 2. In other words, the drive unit 15 and a pair of the vibration sensors 16 and 17, when the two flow tubes are viewed in such a direction as to overlap each other, are disposed between the two tube tubes and aligned with each other on a line connecting the center axes of the flow tubes. This arrangement allows driving force to act on a line connecting the center axes of the two flow tubes, and allows a Coriolis force resulting from the driving force to be detected, free from inertial moment caused by vibration inertial force.

Figure 11:
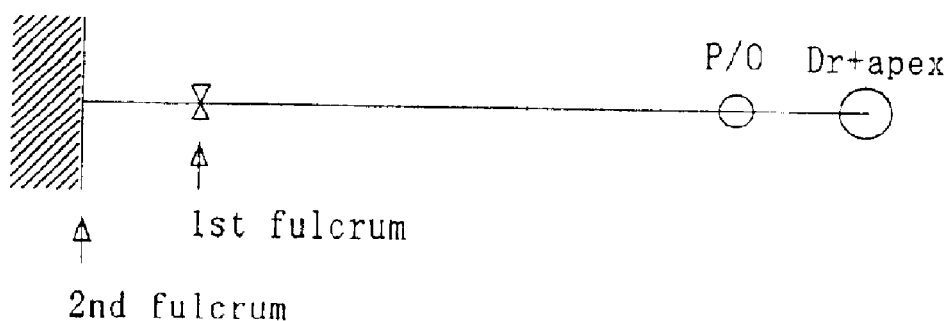
FIG. 11 is a diagram of assistance in explaining the reduced effects of the secondary vibration mode using a straight-tube vibration beam as a model.
Figure 11:
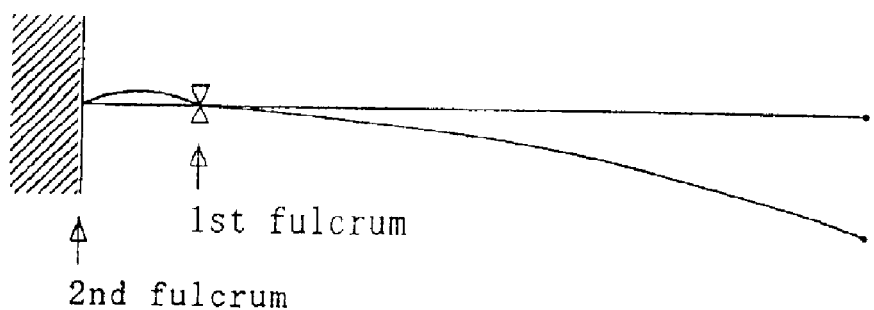
Figure 11:
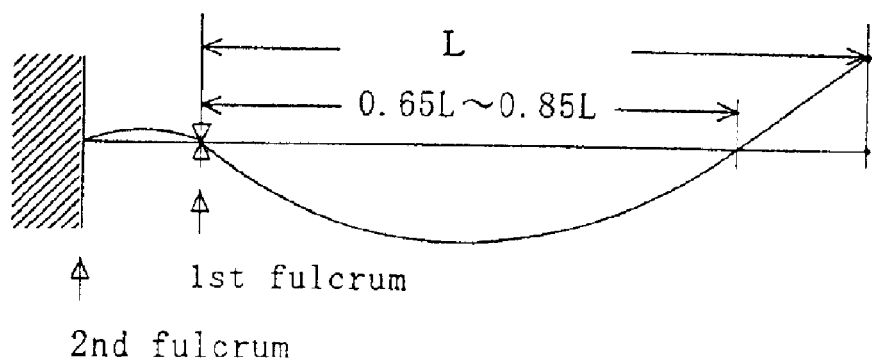

In the embodiment shown in the figures, a pair of the vibration sensors 16 and 17 are disposed at the nodes of the secondary vibration mode at the proximal parts of the inlet and outlet sides that act as vibration beams. FIG. 11 is a schematic diagram of assistance in explaining the reduced effect of the secondary vibration mode, using a straight-tube vibration beam as a model. That is, each of the proximal parts at the inlet and outlet sides of the aforementioned two flow tubes 1 and 2 is expressed by a straight-tube vibration beam (four beams in total), as shown in FIG. 11(A). In the figure, the first vibration fulcrum represents the points at which the base plates 27 and 28 are fixedly fitted to the flow tubes 1 and 2, while the second vibration fulcrum represents the top connecting ends between the flow tubes 1 and 2 and the manifolds 24 and 25. It is assumed that a predetermined weight is connected to the tip of the straight-tube vibration beam. This weight corresponds to the mass of the apexes connecting the proximal parts of the two flow tubes (including the mass of the fluid flowing in the tubes) and the mass of the drive unit (Dr).

On the straight-tube vibration beam, higher-order vibration modes always exist, in addition to the primary fundamental vibration mode used in measurement with the Coriolis mass flow meter shown in FIG. 11(B). Of high-order vibration modes, the secondary vibration mode having a natural frequency close to that of the primary vibration mode could have the largest effect, as shown in FIG. 11(C). When a sensor (shown by P/O in FIG. 11(A)) is disposed on the node of the secondary vibration mode, the sensor is not affected by the secondary vibration mode. The position corresponding to the node of the secondary vibration mode is determined by the weights of the apex, the drive unit, and the sensor; when the distance from the first fulcrum to the apex is assumed to be L, the position corresponding to the node is within a range of 0.65 L–0.85 L from the first fulcrum.

Since the wiring from the drive unit 15 and a pair of the vibration sensors 16 and 17 to the outside is provided by flexible printed circuit boards 12 and 13 bent symmetrically from both the flow tubes 1 and 2 facing each other along the center axes of the flow tubes (right-side and left-side center lines in FIG. 3), the mass added to the vibrating flow tubes 1 and 2, and the stress (added stress) acting from the outside on the vibrating flow tubes 1 and 2 are made perfectly symmetrical. This helps achieve high vibration stability and make the mass flow meter less susceptible to the effects of vibration from the outside. As a result, a mass flow meter with extremely high accuracy can be obtained.

In the figure, numeral 10 refers to a support post for the wiring to the drive unit 15 and a pair of the vibration sensors 16 and 17 and the wiring to the temperature sensor. The support post 10 is supported by the base plate 26 and passes through the meter body 30. The wiring to the drive unit 15 and a pair of the vibration sensors 16 and 17 is drawn over the surfaces of the flow tubes 1 and 2 to the top end of the support post 10 via the flexible printed circuit boards 12 and 13 passed through the inside of the support post 10, and connected to a terminal box 9 provided outside the Coriolis mass flow meter, or directly to an electrical control circuit. The wiring to temperature sensors which are usually provided in multitude is drawn to the outside through the support post 10. When drawing the wiring out of the meter, a pressure-resistant wire bushing made of a plastics molding provided inside the support post 10 seals the wire outlet to shield the inside space from the outside, in conjunction with the aforementioned pressure-resistant case 31.

Figure 4:
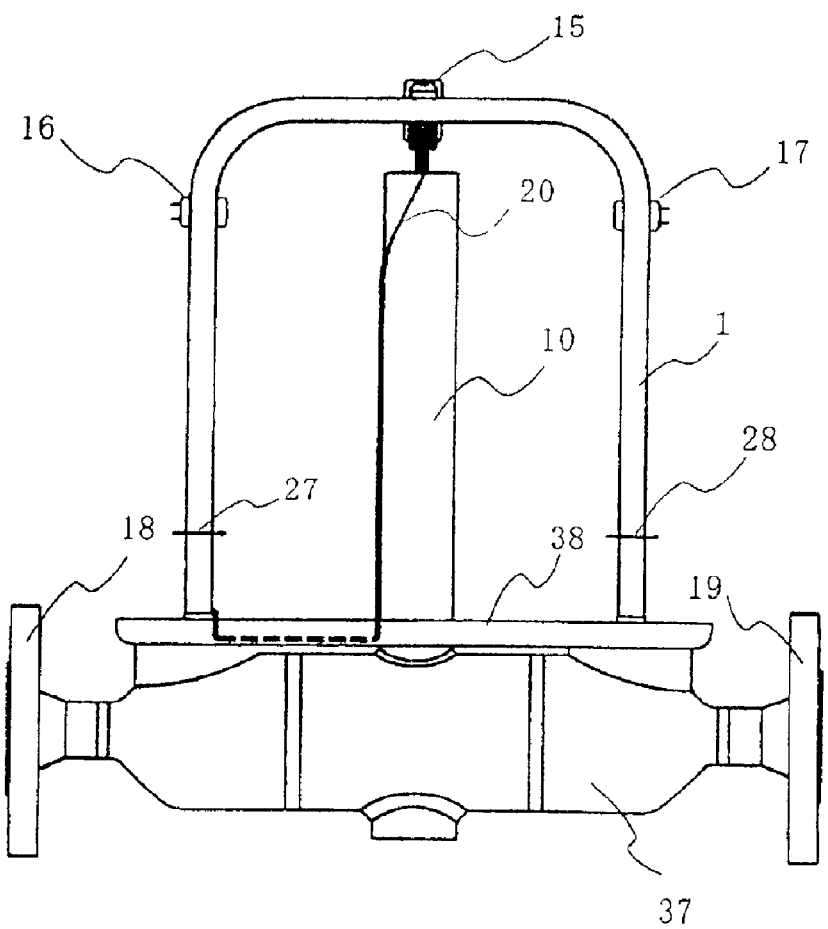
FIG. 4 is a diagram illustrating a second example of Coriolis mass flow meter to which this invention is applied, viewed from the front, with flow tubes comprising two parallel curved tubes mounted on the vertical plane
Figure 5:
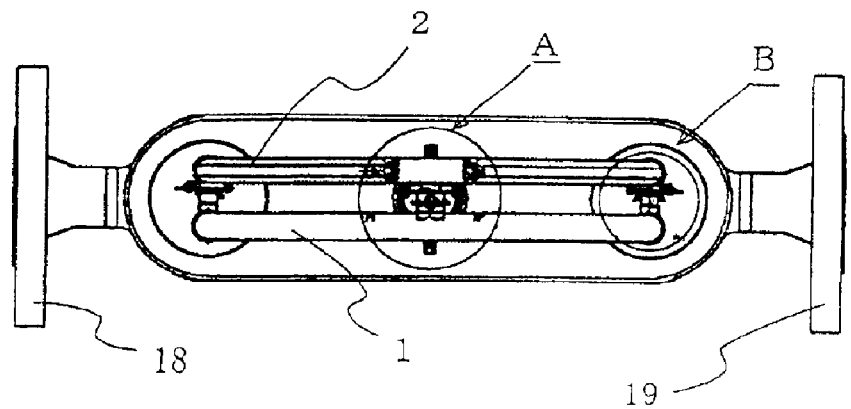
FIG. 5 is a diagram viewed from the top of the Coriolis mass flow meter shown in FIG. 4
Figure 6:
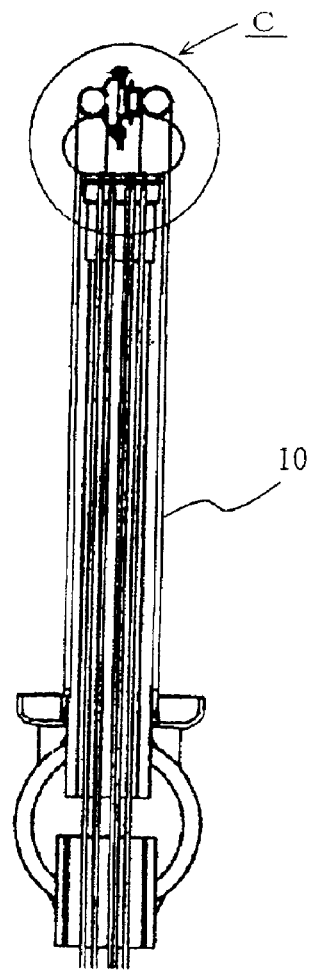
FIG. 6 is a cross-sectional view of the Coriolis mass flow meter shown in FIG. 4
Figure 7:
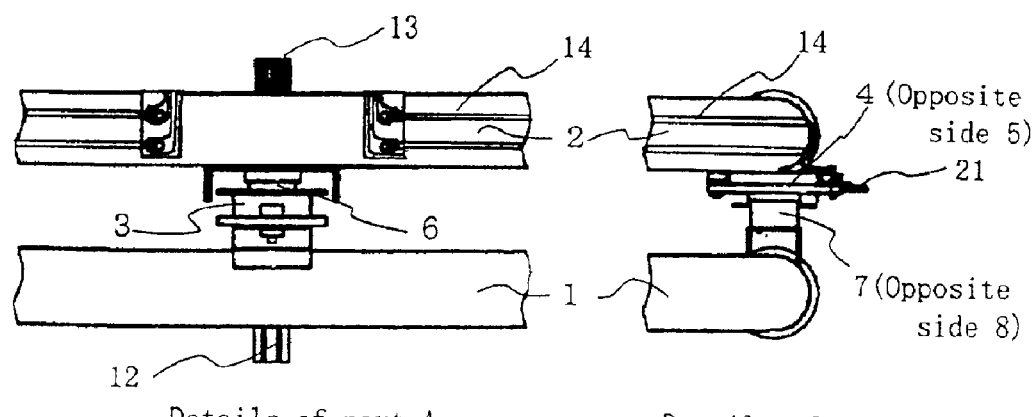
FIG. 7 is a diagram illustrating the details of parts A and B of FIG. 5
Figure 8:
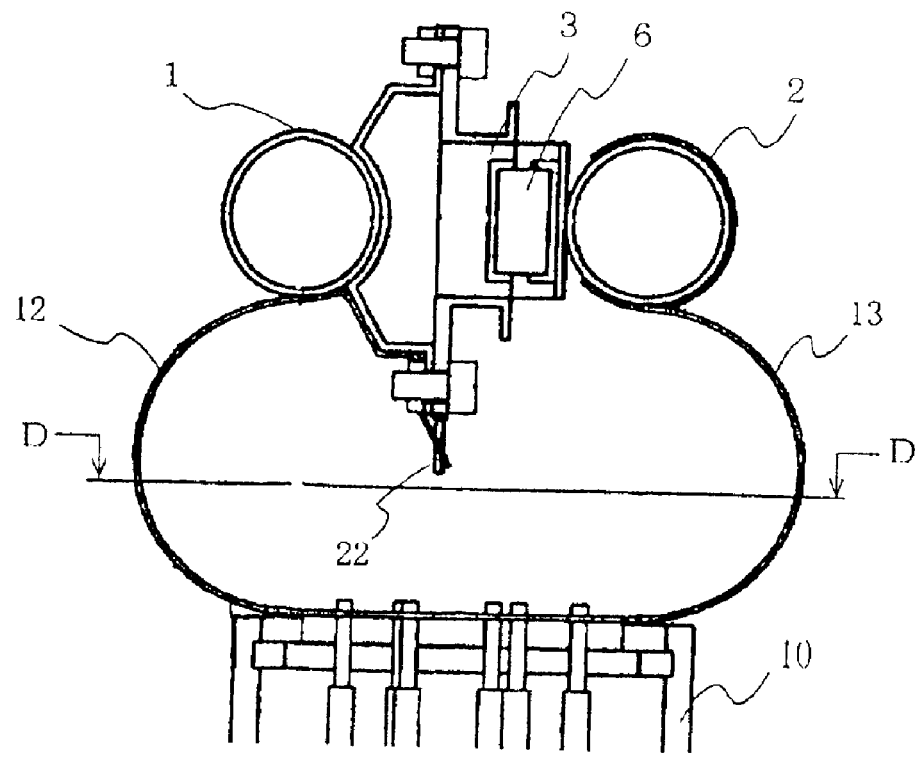
FIG. 8 is a diagram illustrating the details of part C of FIG. 6
Figure 9:
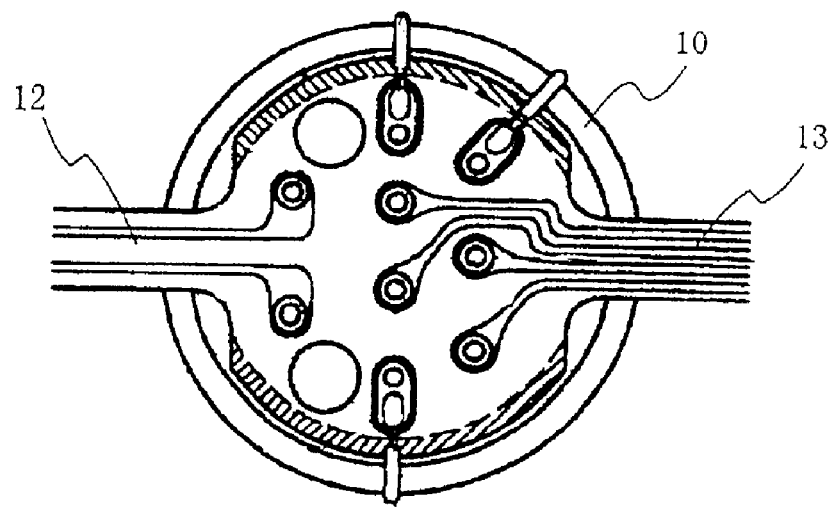
FIG. 9 is a diagram taken in the direction of the arrows substantially along the line D—D of FIG. 8
Figure 10:
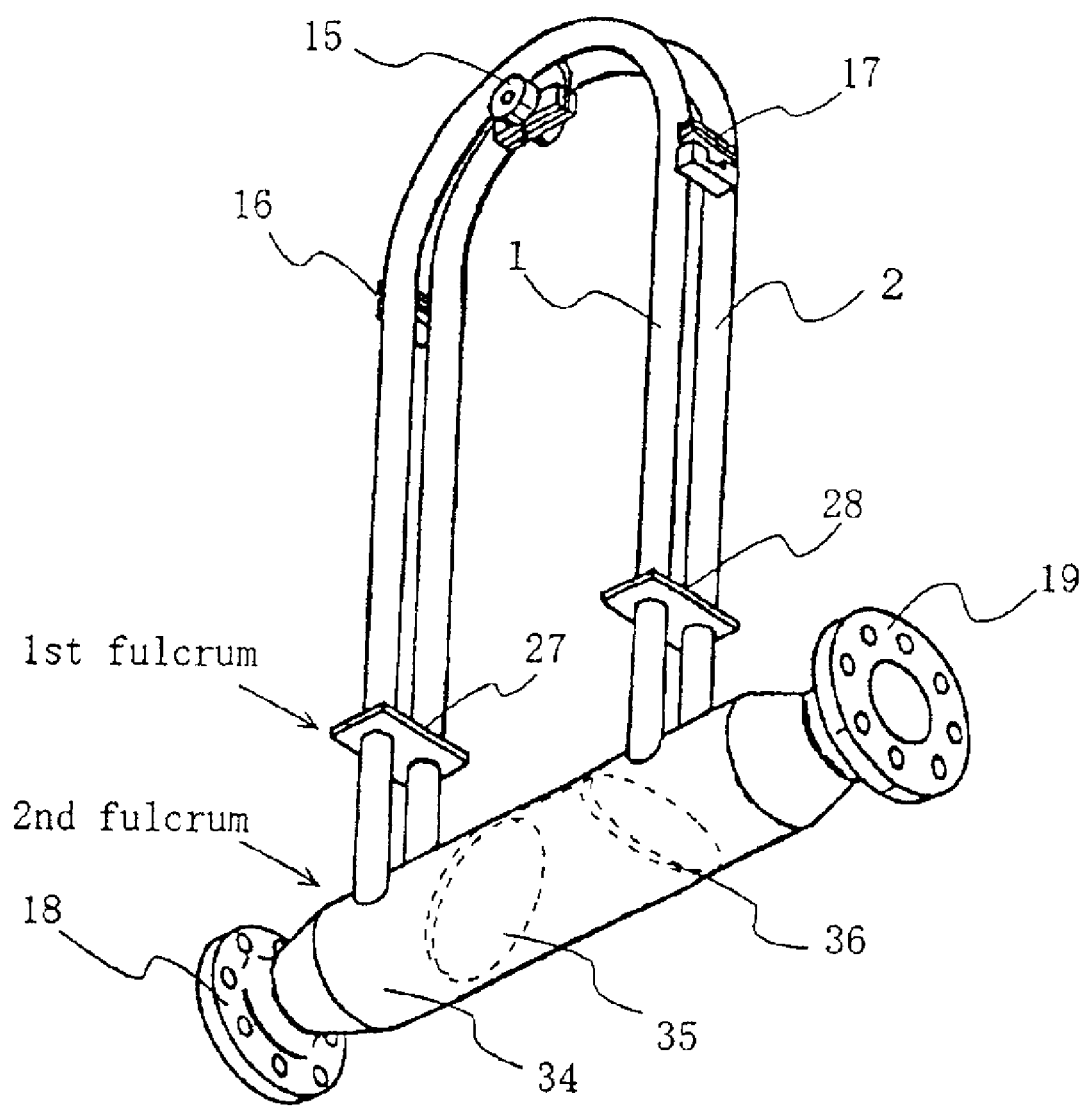
FIG. 10 is a schematic diagram of a conventional two parallel curved tube type of a prior art Coriolis mass flow meter.

FIGS. 4 through 9 are diagrams illustrating an example of Coriolis mass flow meter to which this invention is applied. FIG. 4 is a front view of a Coriolis mass flow meter, with two parallel curved tubes installed on the vertical plane. FIG. 5 is a top view of the Coriolis mass flow meter shown in FIG. 4; the details of parts A and B thereof shown in FIG. 7. FIG. 6 is a cross-sectional view of the Coriolis mass flow meter shown in FIG. 4 by cutting at the center thereof; part C thereof shown in FIG. 8. FIG. 9 is a fragmentary view taken in the direction of the arrows substantially along the line D—D of FIG. 8.

The Coriolis mass flow meter shown in the figures is of a normal construction, except the layout and wiring of coils and magnets of the drive unit 15 and a pair of the vibration sensors 16 and 17, which are characteristics of the invention. The flow tubes 1 and 2 are curved tubes of the same gate shape; both ends thereof connected to a manifold (not shown) so as to form fluid passages. In the vicinity of both ends of the flow tubes 1 and 2 provided are base plates 27, 28 for forming nodes when the flow tubes 1 and 2 are caused to resonate with each other like a tuning fork, and the flow tubes 1 and 2 are fixedly fitted to maintain in parallel with each other.

The fluid being measured is passed through the flange 18, divided equally to the two flow tubes 1 and 2 at the inlet side, and joined together at the outlet side of the flow tubes 1 and 2. The drive unit 15 drives the flow tubes 1 and 2 comprising two parallel curved tubes at the central part thereof to cause the tubes 1 and 2 to resonate with each other at an opposite phase. A pair of vibration sensors 16 and 17 are disposed at symmetrical positions with respect to the mounting position of the drive unit 15 to detect a phase difference proportional to Coriolis force.

Although the present invention is not different from a prior art in that each of the drive unit 15 and the vibration sensors 16 and 17 comprises coils and magnets, the Coriolis mass flow meter shown in FIGS. 4 through 9 is characterized by the layout and wiring to them. In the figures, numeral 10 refers to a support post for the wiring leading to the drive unit 15 and the vibration sensors 16 and 17, and the wiring to a temperature sensor, 20 to the wiring to the temperature sensor. The support post 10 is supported by a base 38 in such a manner as to face the drive unit 15, and passes through the meter body 37. Coils of the drive unit 15 and a pair of the vibration sensors 16 and 17 can of course be distributed to the two flow tubes, and at the same time, the effects of wiring can be dispersed without using the support post 10 by providing the wiring over the surfaces of the flow tubes toward the inlet and outlet sides of the flow tubes. But the use of the support post 10 can disperse the effects of wiring more positively.

As shown in FIG. 7 illustrating the details of part A of FIG. 5, or FIG. 8 illustrating the details of part C of FIG. 6, the coil 3 of the drive unit 15 is fitted to a flow tube 1, and the magnet 6 thereof to the other flow tube 2 via fixtures. The wiring to the drive unit coil 3 is connected to the outside of the Coriolis mass flow meter via a flexible printed circuit board 12 soldered at a soldering part 22 and the wiring inside the support post 10. The flexible printed circuit board itself used in this invention is publicly known, such as a flexible printed circuit board made of a copper foil sandwiched by polyimide films, having a predetermined width, as shown in FIG. 9.

A pair of the vibration sensors 16 and 17 are such that a vibration sensor magnet 7 is fitted to a flow tube 1 and a vibration sensor coil 4 to the other flow tube 2 via fixtures, as shown in FIG. 7 illustrating the details of part B of FIG. 5. That is, the vibration sensor magnet 7 is fitted to the one flow tube 1 to which the aforementioned drive unit coil 3 is fitted, and the vibration sensor coil 4 is fitted to the other flow tube 2 to which the drive unit magnet 6 is fitted.

The wiring to the vibration sensor coils 4 and 5 is achieved by providing a Teflon wire 14 (a copper wire or foil covered with Teflon) soldered at the soldering part 21 and laid over the surface of the flow tube 2, as shown in FIG. 7 illustrating the details of part B of FIG. 5. The Teflon wire 14 extends over the surface of the flow tube 2 from the vibration sensor coils 4 and 5 provided on the flow tubes at symmetrical positions with respect to the mounting position of the drive unit 15 toward the support post 10, and the right and left Teflon wires 14 are connected to the flexible printed circuit board 13 at the central part (FIG. 8) and to the outside of the Coriolis mass flow meter via the wiring inside the support post 10. As shown in FIGS. 8 and 9, the flexible printed circuit board 13 has the same rigidity and shape as the flexible printed circuit board 12 for the wiring to the drive unit coil 3 to form a pair, and is formed almost symmetrically so as to minimize and equalize the effects of mass, etc. on the flow tubes 1 and 2. In FIG. 9 showing the top end of the support post 10, the flexible printed circuit board 13 on the left side is for the wiring to the drive unit coil 3, and the flexible printed circuit board 13 on the right side is for the wiring to the vibration sensor coils 4 and 5. In addition, terminals for wiring to the temperature sensor through the support post 10 are also shown in the figure.

INDUSTRIAL APPLICABILITY

As described above, this invention can provide a high-precision Coriolis mass flow meter of a type using two parallel flow tubes having high vibration stability.

What is claimed is:

1. A Coriolis mass flow meter comprising:
two parallel flow tubes of a curved tube type having base plates fixedly fitted to them at points serving as vibration fulcrums;
a drive unit disposed at the central part of said flow tubes for causing any one of said flow tubes to resonate with the other tube in a phase opposite to each other;
a pair of vibration sensors disposed at symmetrical positions with respect to the mounting position of said drive unit for sensing a phase difference proportional to Coriolis force; said drive unit and a pair of said vibration sensors each being formed by a coil and a magnet; said drive unit coil is fitted to any one of said flow tubes and said drive unit magnet is fitted to the other of said flow tubes, and magnets of said vibration sensors are fitted to said any one of said flow tubes and coils of said vibration sensors are fitted to said other flow tube, wherein a support post facing at the end thereof said drive unit provided at the central part of said flow tubes and having wires for electrical connection passed therein is provided; a first flexible printed circuit board extending from the end surface of said support post to the one flow tube is connected to said drive unit coil, and a second flexible printed circuit board extending from the end surface of said support post to the other flow tube is connected to wires extended from coils of said vibration sensors along the surface of said flow tubes in such a manner that said flexible printed circuit boards are bent at the central part of said flow tubes almost symmetrically with respect to the vibration center of each flow tube.

2. A Coriolis mass flow meter comprising:
an inlet manifold having an inlet side with a single port, said inlet manifold having an outlet side with first and second ports;
a first flow tube having an upstream end connected to said first port of said inlet manifold;
a second flow tube having an upstream end connected to said second part of said inlet manifold;
an outlet manifold having an inlet side with first and second ports, said first port of said outlet manifold being connected to a downstream end of said first flow tube, said second port of said outlet manifold being connected to a downstream end of said second flow tube, said outlet manifold having an outlet side with a single port, said outlet manifold being a separate structure from said inlet manifold;
a drive unit vibrateable of said first and second flow tubes in opposite phase to each other;
a pair of vibration sensors for sensing a phase difference between said first and second flow tubes caused by a Coriolis force from fluid flowing through said first and second flow tubes;
base plates connected to said first and second flow tubes and forming first vibration fulcrums, a connection between said first and second ports of said inlet manifold and a connection between said first and second ports of said outlet manifold forming second vibration fulcrums;
a meter body connected to said inlet side of said inlet manifold and connected to said outlet side of said outlet manifold, said meter body being spaced from said second vibration fulcrums, said meter body being connected to said manifolds to transmit external vibrations between said inlet side of said inlet manifold and said outlet side of said outlet manifold, wherein:
said drive unit includes a magnet connected to said first flow tube and includes a coil connected to said second flow tube;
each of said sensors include a magnet connected to said second flow tube and include a coil connected to said first flow tube
said first and second flow tubes have a U shape;
a support post is arranged on said meter body and extends along a center of said U shape;
said drive unit is arranged in a center of said U shape;
a first flexible circuit board extends from said support post to said first flow tube; and
a second flexible circuit board extends from said support post to said second flow tube, said first and second flexible circuit boards curve substantially symmetrically.

3. A meter in accordance with claim 2, wherein:
said drive unit vibrates said first and second flow tubes toward and away from each other.

4. A meter in accordance with claim 2, wherein:

said meter body is spaced from said first and second ports of said inlet and outlet manifold.

5. A meter in accordance with claim 2, wherein:

said first and second ports of said inlet manifold are spaced from each other;

said first and second ports of said outlet manifold are spaced from each other.

6. A meter in accordance with claim 2, wherein:

said vibration sensors are arranged at secondary vibration nodes of said first and second flow tubes.

7. A meter in accordance with claim 2, wherein:

said inlet and outlet manifolds have a shape to preclude the manifolds from having a particular natural frequency.

8. A meter in accordance with claim 2, wherein:

said inlet and outlet manifolds have a continuously increasing shape without a particular natural frequency.

* * * * *